United States Patent
Jiang

(10) Patent No.: US 12,511,931 B2
(45) Date of Patent: Dec. 30, 2025

(54) FOLDABLE DISPLAY APPARATUS AND CALIBRATION METHOD FOR FINGERPRINT DETECTION OF FOLDABLE DISPLAY APPARATUS

(71) Applicants: Wuhan Tianma Microelectronics Co., Ltd. Shanghai Branch, Shanghai (CN); Wuhan Tianma Microelectronics Co., Ltd., Wuhan (CN)

(72) Inventor: Mengying Jiang, Shanghai (CN)

(73) Assignees: Wuhan Tianma Microelectronics Co., Ltd. Shanghai Branch, Shanghai (CN); Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 18/766,634

(22) Filed: Jul. 8, 2024

(65) Prior Publication Data
US 2024/0404314 A1    Dec. 5, 2024

(51) Int. Cl.
*G06V 40/13* (2022.01)
*G06F 1/16* (2006.01)
*G06F 3/044* (2006.01)

(52) U.S. Cl.
CPC ........ *G06V 40/1318* (2022.01); *G06F 1/1641* (2013.01); *G06F 3/0446* (2019.05)

(58) Field of Classification Search
None
See application file for complete search history.

(56) References Cited

U.S. PATENT DOCUMENTS

| 2022/0058363 A1* | 2/2022 | Moon | G06F 3/0446 |
| 2024/0194104 A1* | 6/2024 | Kim | G06F 1/1652 |

* cited by examiner

*Primary Examiner* — Joseph R Haley
(74) *Attorney, Agent, or Firm* — Wiersch Law Group

(57) ABSTRACT

A foldable display apparatus and a calibration method for fingerprint detection of the foldable display apparatus. The foldable display apparatus includes a display panel and a fingerprint identification sensor. The display panel includes imaging holes. The fingerprint identification sensor includes sensing elements. The method includes: after the foldable display apparatus is switched from an unfolded state to a folded state, determining a target sensing element group corresponding to an imaging hole when the foldable display apparatus is in the folded state, the target sensing element group includes a target number of sensing element in the sensing elements, a center of the target sensing element group is located at a target position, and the target number is an integer greater than or equal to 1; and in the folded state, imaging a fingerprint pattern based on a signal fed back by the target sensing element group corresponding to the imaging hole.

14 Claims, 10 Drawing Sheets

---

Obtaining an initial sensing element group corresponding to the imaging hole when the foldable display apparatus is in the unfolded state, wherein the initial sensing element group comprises an initial number of sensing element  — S11

Determining a displacement of the target position with respect to the initial position and a number difference between the initial number and the target number according to a bending angle of the display panel when the foldable display apparatus is in the folded state  — S12

Obtaining the target sensing element group according to the initial number, the initial position, the displacement, and the number difference, wherein the target sensing element group has the center at the target position and the target number  — S13

FOLDABLE DISPLAY APPARATUS AND CALIBRATION METHOD FOR FINGERPRINT DETECTION OF FOLDABLE DISPLAY APPARATUS

CROSS-REFERENCE TO RELATED APPLICATIONS

The present application claims priority to Chinese Patent Application No. 202410200208.1, filed on Feb. 22, 2024, the content of which is incorporated herein by reference in its entirety.

TECHNICAL FIELD

The present disclosure relates to the display field, and in particular, to a foldable display apparatus and a calibration method for fingerprint detection of the foldable display apparatus.

BACKGROUND

A display apparatus provides users with functions such as input and dialogue by displaying information such as images. In recent years, with the increasing variety of display screens, the foldable display screen has gradually become one of the mainstream screens.

Fingerprint identification is an indispensable part of the current electronic product. Fingerprint identification can be used in electronic devices such as smartphones or tablets to improve the security of the device. How to reduce the impact of deformation of the foldable display screen on fingerprint detection accuracy is a problem worthy of attention.

SUMMARY

According to a first aspect of the present disclosure, a calibration method for fingerprint detection of a foldable display apparatus is provided. The foldable display apparatus includes a display panel and a fingerprint identification sensor. The display panel includes a plurality of imaging holes, and the fingerprint identification sensor includes a plurality of sensing elements. The calibration method includes: after the foldable display apparatus is switched from an unfolded state to a folded state, determining a target sensing element group corresponding to an imaging hole of the plurality of imaging holes when the foldable display apparatus is in the folded state, wherein the target sensing element group comprises a target number of sensing element in the plurality of sensing elements, a center of the target sensing element group is located at a target position, and the target number is an integer greater than or equal to 1; and in the folded state, imaging a fingerprint pattern based on a signal fed back by the target sensing element group corresponding to the imaging hole.

According to a second aspect of the present disclosure, a foldable display apparatus is provided. The foldable display apparatus includes a display panel, a fingerprint identification sensor, and a sensing element determination module. The display panel includes a plurality of imaging holes, and the fingerprint identification sensor includes a plurality of sensing elements. the sensing element determination module is configured to: after the foldable display apparatus is switched from an unfolded state to a folded state, determine a target sensing element group corresponding to an imaging hole of the plurality of imaging holes when the foldable display apparatus is in the current folded state, wherein the target sensing element group comprises a target number of sensing element in the plurality of sensing elements, a center of the target sensing element group is located a target position, and the target number is an integer greater than or equal to 1; and in the folded state, image a fingerprint pattern based on a signal fed back by the target sensing element group corresponding to the imaging hole.

BRIEF DESCRIPTION OF DRAWINGS

In order to more clearly explain the embodiments of the present disclosure or the technical solution in the related art, the drawings to be used in the description of the embodiments or the related art will be briefly described below. The drawings in following description are some embodiments of the present disclosure. For those skilled in the art, other drawings may also be obtained based on these drawings.

DESCRIPTION OF EMBODIMENTS

In order to better understand the technical solutions of the present disclosure, the embodiments of the present disclosure will be described in detail below with reference to the accompanying drawings.

It should be clear that the described embodiments are merely some of rather than all of the embodiments of the present disclosure. All other embodiments obtained by those of ordinary skill in the art based on the embodiments in the present disclosure fall within the scope of the present disclosure.

The terms used in the embodiments of the present disclosure are merely for the purpose of describing specific embodiment, rather than limiting the present disclosure. The terms "a", "an", "the" and "said" in a singular form in the embodiment of the present disclosure and the attached claims are also intended to include plural forms thereof, unless noted otherwise.

Figure 1:
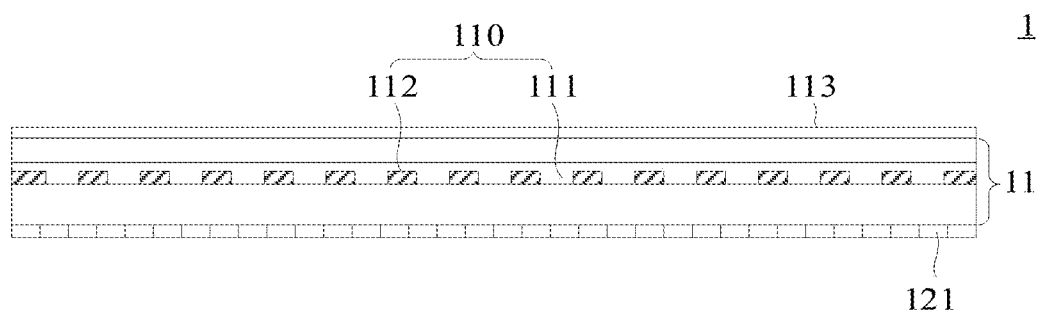
FIG. 1 is a cross-sectional view of a foldable display apparatus in an unfolded state according to some embodiments of the present disclosure.
Figure 2:
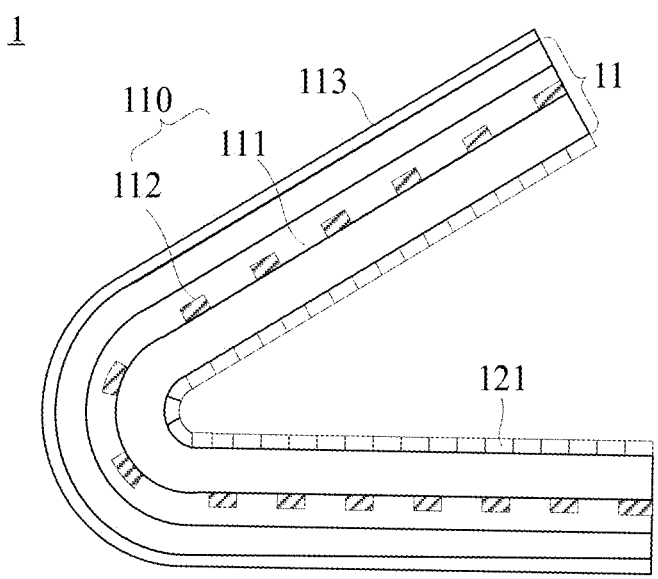
FIG. 2 is a cross-sectional view of the foldable display apparatus of FIG. 1 in a folded state according to some embodiments of the present disclosure.

Embodiments of the present disclosure provide a calibration method for fingerprint detection of a foldable display apparatus. An operation state of the foldable display apparatus includes an unfolded state and a folded state. FIG. 1 is a cross-sectional view of a foldable display apparatus in an unfolded state according to some embodiments of the present disclosure. FIG. 2 is a cross-sectional view of the foldable display apparatus of FIG. 1 in a folded state. As shown in FIG. 1 and FIG. 2, the foldable display apparatus 1 includes a display panel 11 and a fingerprint identification sensor. The fingerprint identification sensor includes a plurality of sensing elements 121. For example, the display panel 11 includes a flexible display panel. The display panel 11 is capable of bending to switch between different states. FIG. 2 shows one folded state of the display panel 11. The display panel 11 may be in different folded states according to actual needs. The folded states of the display panel 11 are not limited in the present disclosure. The display panel 11 includes a plurality of imaging holes 111. In some embodiments of the present disclosure, as shown in FIG. 1 and FIG. 2, the display panel 11 includes a light-blocking layer 110, and the imaging holes 111 are formed on the light-blocking layer 110. For example, the light-blocking layer 110 further includes light-blocking parts 112 surrounding the imaging holes 111. The light-blocking part 112 can prevent reflection light from passing.

In some embodiments of the present disclosure, the fingerprint identification sensor further includes a fingerprint identification light source and a controller. In the fingerprint identification process, the fingerprint identification light source emits light, the light is incident on the finger and reflected by the finger, the reflected light enters the sensing element 121 via the imaging holes 111, and the sensing element 121 perform imaging based on the pinhole imaging principle. The controller generates a fingerprint image by splicing the images formed by the sensing element 121 corresponding to the imaging holes 111, and compares the collected fingerprint image and a reference image pre-stored to perform the comparison authentication.

In some embodiments of the present disclosure, the display panel 11 includes light-emitting elements, and the light-emitting elements may be reused as the above fingerprint identification light source. For example, the light-emitting element includes any one of organic light-emitting diode (OLED), quantum dots light-emitting diode (QLED), and Micro light-emitting diode (Micro-LED).

Figure 3:
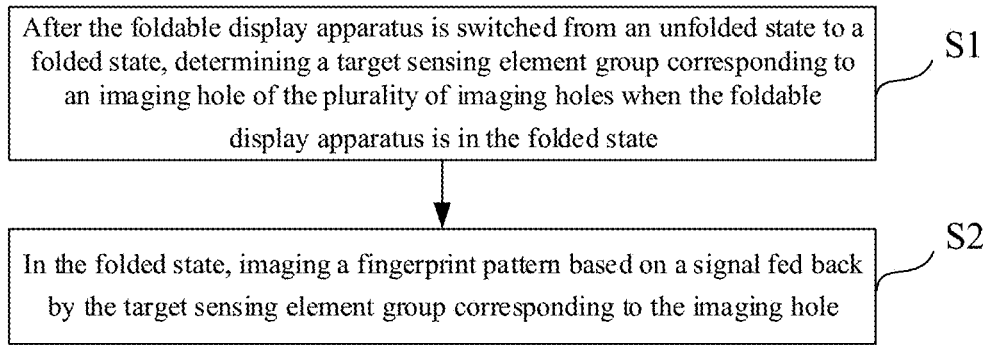
FIG. 3 is a flow chart of a calibration method for fingerprint detection of a foldable display apparatus according to some embodiments of the present disclosure.
Figure 4:
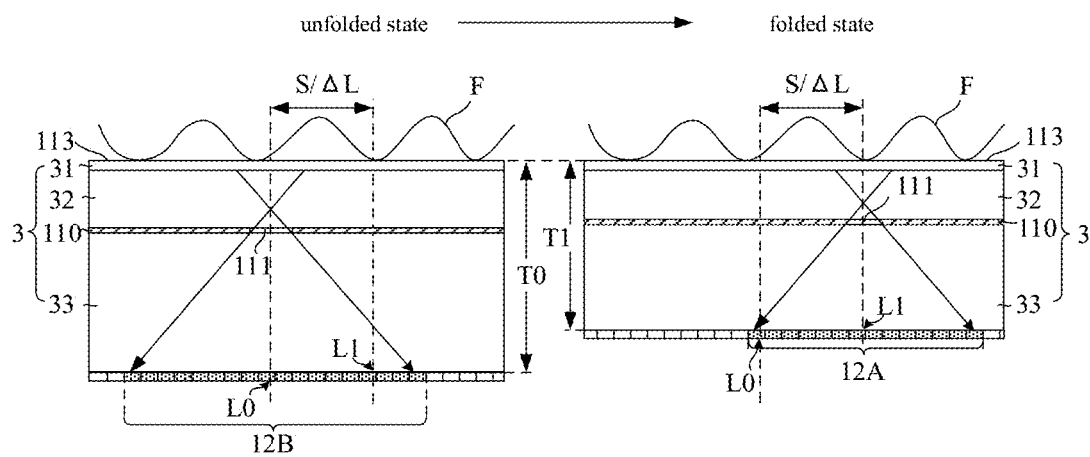
FIG. 4 is a schematic diagram showing switching of the foldable display apparatus from the unfolded state to the folded state according to some embodiments of the present disclosure.

FIG. 3 is a flow chart of a calibration method for fingerprint detection of a foldable display apparatus according to some embodiments of the present disclosure. FIG. 4 is a schematic diagram showing switching of the foldable display apparatus from the unfolded state to the folded state according to some embodiments of the present disclosure. As shown in FIG. 3 and FIG. 4, the calibration method for fingerprint detection includes the following steps.

In step S1, after the foldable display apparatus 1 is switched from the unfolded state to the folded state, a target sensing element group 12A corresponding to the imaging hole 111 when the foldable display apparatus is in the folded state is obtained. The target sensing element group 12A includes a target number N1 of sensing element 121, and a center of the target sensing element group 12A is located a target position L1. The target number N1 is an integer greater than or equal to 1. For example, the target sensing element group 12A includes m1*n1 sensing elements 121 arranged in an array. That is, N1=m1*n1, m1 and n1 are positive integers. The imaging holes 111 corresponding to the target sensing element group 12A are the imaging holes 111 transmitted by the fingerprint reflection light received by the sensing element 121 in the target sensing element group 12A. An electrical signal generated by the sensing element 121 in the target sensing element group 12A can reflect the intensity of the reflection light passing through the corresponding imaging hole 111. As shown in FIG. 4, when the foldable display apparatus is in the folded state, the sensing element 121 filled with a shadow pattern represent the target sensing element group 12A in the plurality of sensing elements 121. When the foldable display apparatus is in the unfolded state, the sensing element 121 filled with a shadow pattern represent an initial sensing element group 12B in the plurality of sensing elements 121. The sensing element 121 at the target position L1 is a sensing element 121 generating the electrical signal with the largest magnitude among the target sensing element group 12A when the foldable display apparatus performs fingerprint identification in the current folded state.

In step S2, in the folded state, a fingerprint pattern is imaged based on a signal fed back by the target sensing element group 12A corresponding to the imaging hole 111. For example, imaging is performed based on the signal fed back by the target sensing element group 12A, and the collected fingerprint image is compared with a pre-stored reference image to perform permission validation and the like.

The inventors found that the correspondence relationship between the imaging hole 111 and the sensing element 121 is changed due to deformation when the foldable display apparatus 1 is in the folded state. When a finger F presses a surface of the foldable display apparatus 1 for fingerprint identification, for the fingerprint imaging process, the default sensing element 121 corresponding to the imaging hole 111 are the sensing element 121 which the reflected light that transmits through the imaging hole 111 is incident on. That is, the light received by the sensing element 121 is the reflected light that transmits through the corresponding imaging hole 111. When the foldable display apparatus 1 is in the folded state, if the fingerprint identification is performed with the sensing element 121 corresponding to the imaging hole 111 when the foldable display apparatus 1 is in the unfolded state, the signal generated by the sensing element 121 does not accurately indicated the intensity of the light passing through the corresponding imaging hole 111, thereby affecting the precision of the fingerprint imaging and the accuracy of the fingerprint identification.

According to the calibration method for fingerprint detection provided by embodiments of the present disclosure, the target sensing element group 12A corresponding to the imaging hole 111 in the folded state is obtained. When the foldable display apparatus 1 is in the folded state, the fingerprint imaging is performed according to information from the target sensing element group 12A corresponding to the imaging hole 111. In this way, an accurate fingerprint image is obtained, the subsequent identification process is more accurate, and the precision of the fingerprint imaging and the accuracy of the fingerprint identification are improved when the foldable display apparatus 1 is in the folded state.

The folded state of the foldable display apparatus 1 may change. For example, the foldable display apparatus 1 may be switched from a current folded state to another different folded state. According to the calibration method for fingerprint detection provided by embodiments of the present disclosure, the target sensing element group 12A corresponding to the imaging hole 111 in the new folded state is obtained. In the fingerprint identification, the fingerprint imaging in the new folded state is performed according to information from the new obtained target sensing element group 12A corresponding to the imaging hole 111. As stated above, with the calibration method for fingerprint detection provided by embodiments of the present disclosure, the target sensing element group 12A corresponding to the imaging hole 111 may be updated as the folding state of the foldable display apparatus 1 changes, so the precision of the fingerprint imaging and the accuracy of the fingerprint identification are improved when the foldable display apparatus 1 is in different folding states.

In some embodiments of the present disclosure, the fingerprint identification sensor further includes a storage unit. After the target sensing element group 12A corresponding to the imaging hole 111 is obtained with the method of the present disclosure, the information of the target sensing element group 12A corresponding to the imaging hole 111 in the current folded state (the correspondence relationship between the imaging holes 111 and the target sensing element group 12A in the current folded state) is stored in the storage unit. In the subsequent fingerprint identification process, the fingerprint identification may be performed quickly using data fed back from the target sensing element group 12A obtained based on the above correspondence relationship, and the imaging holes 111 corresponding to the target sensing element group 12A may be determined quickly and accurately.

Figure 5:
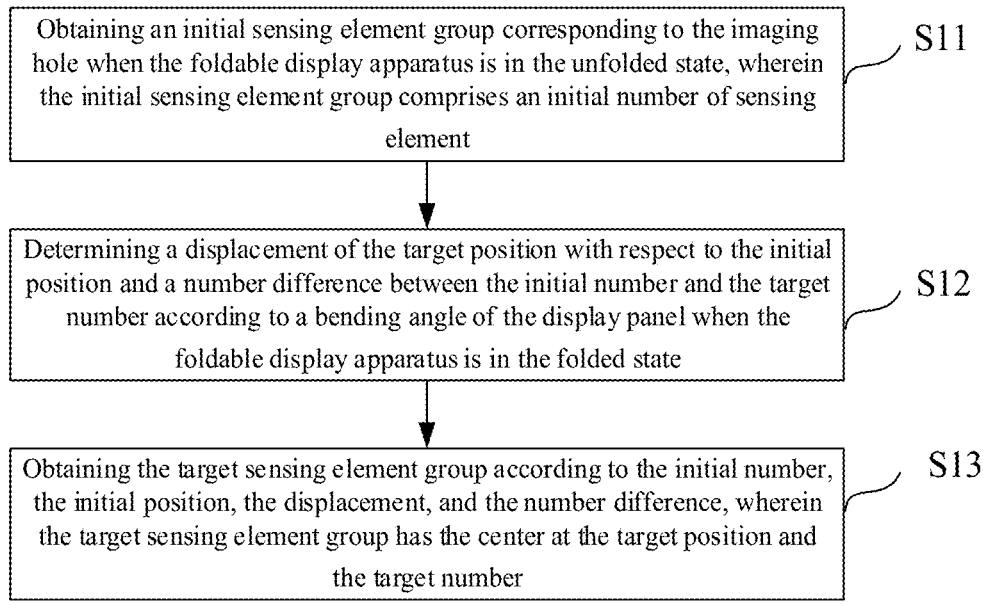
FIG. 5 is a flow chart of another calibration method for fingerprint detection of a foldable display apparatus according to some embodiments of the present disclosure.

FIG. 5 is a flow chart of another calibration method for fingerprint identification of a foldable display apparatus according to some embodiments of the present disclosure. In some embodiments of the present disclosure, as shown in FIG. 4 and FIG. 5, step S1 of determining the target sensing element group 12A corresponding to the imaging hole 111 when the foldable display apparatus is in the folded state includes the following steps.

In step S11, an initial sensing element group 12B corresponding to the imaging hole 111 when the foldable display apparatus is in the unfolded state is obtained. The initial sensing element group 12B includes an initial number N0 of sensing element 121, and a center of the initial sensing element group 12B is located at an initial position L0. The initial number N0 is an integer greater than or equal to 1. For example, the initial sensing element group 12B includes m0*n0 sensing element 121 arranged in an array. N0=m0*n0, and m0 and n0 are both integers greater than or equal to 1. In some embodiments of the present disclosure, the correspondence relationship between the initial sensing element group 12B and the imaging holes 111 may be stored in the storage unit in advance. As shown in FIG. 4, in the unfolded state, the center (the initial position L0) of the initial sensing element group 12B overlaps the center of the imaging holes 111 in a thickness direction of the display panel 11, and the sensing element 121 located at the initial position L0 is the sensing element 121 that receives the largest-intensity signal among the initial sensing element group 12B when the display panel 11 is in the unfolded state.

In step S12, a displacement ΔL of the target position L1 with respect to the initial position L0 and a difference ΔN between the initial number N0 and the target number N1 are determined according to a bending angle of the display panel when the display panel 11 is in the current folded state. ΔN=N1−N0. The display panel 11 is deformed when being bent. A deformation degree of a layer in the display panel 11 is different when the display panel 11 is bent by different angles. Accordingly, the correspondence relationship between the imaging holes 111 and the sensing element 121 is changed. In some embodiments of the present disclosure, the displacement ΔL and the quantity difference ΔN may be measured in advance for multiple different bending angles, and the correspondence relationship between the bending angle and the displacement ΔL and the correspondence relationship between the bending angle and the quantity difference ΔN are obtained.

In step S13, the target sensing element group 12A is determined according to the initial number N0, the initial position L0, the displacement ΔL, and the difference ΔN. The center of the target sensing element group 12A is at the target position L1 and the number of the sensing element in the target sensing element group 12A is the target number N1.

Figure 6:
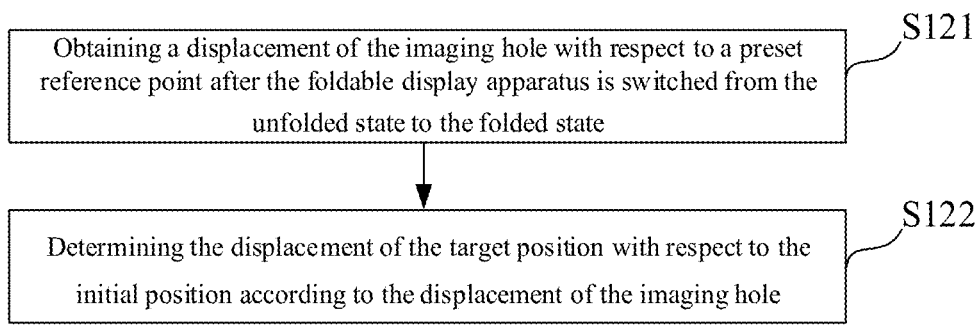
FIG. 6 is a flow chart of another calibration method for fingerprint detection of a foldable display apparatus according to some embodiments of the present disclosure.

FIG. 6 is a flow chart of another calibration method for fingerprint identification of a foldable display apparatus according to some embodiments of the present disclosure. In some embodiments of the present disclosure, as shown in FIG. 4 and FIG. 6, step S12 of determining the displacement ΔL of the target position L1 with respect to the initial position L0 includes the following steps.

In step S121, after the foldable display apparatus 1 is switched from the unfolded state to the current folded state, a displacement of the imaging hole 111 with respect to a preset reference point is obtained. For example, the preset reference point may be the geometric center of the plane where the imaging holes 111 are located, or any point of the plane where the imaging holes 111 are located, or a position easy to determine, which is not limited in embodiments of the present disclosure.

In step S122, the displacement ΔL of the target position L1 with respect to the initial position L0 is determined according to the displacement of the imaging hole 111. In the current folded state, the center (the target position L1) of the target sensing element group 12A overlaps the center of the imaging hole 111 in the thickness direction of the display panel 11.

In some embodiments of the present disclosure, after the display panel 11 is folded, the position of the imaging holes 111 is changed, the position of the center of the sensing element group corresponding to the imaging hole 111 is also changed. In some embodiments of the present disclosure, the displacement ΔL of the target position L1 with respect to the initial position L0 is determined according to the displacement of the imaging hole 111. Therefore, the target sensing element group 12A corresponding to the imaging hole 111 in the current folded state is determined easily and accurately, and the efficiency of the calibration method for fingerprint detection is improved.

Figure 7:
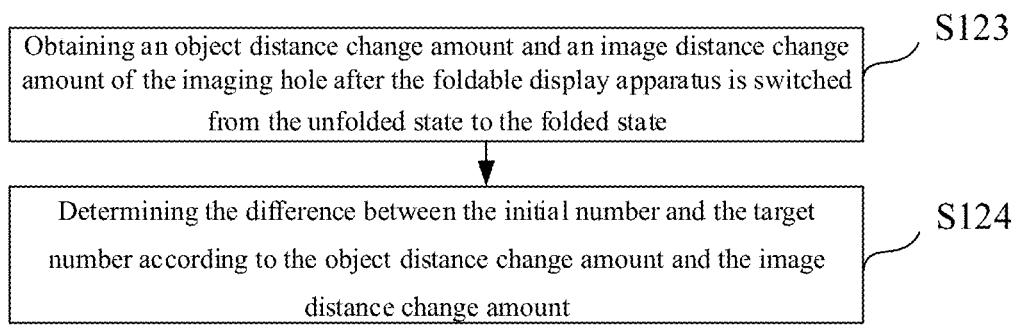
FIG. 7 is a flow chart of another calibration method for fingerprint detection of a foldable display apparatus according to some embodiments of the present disclosure.

FIG. 7 is a flow chart of another calibration method for fingerprint identification of a foldable display apparatus according to some embodiments of the present disclosure. In some embodiments of the present disclosure, as shown in FIG. 4 and FIG. 7, step S12 of determining the difference ΔN between the initial number N0 and the target number N1 includes the following steps.

In step S123, after the foldable display apparatus 1 is switched from the unfolded state to the current folded state, an object distance change amount ΔT1 and an image distance change amount ΔT2 of the imaging hole 111 are obtained. As shown in FIG. 1, FIG. 2, and FIG. 4, the foldable display apparatus 1 includes a touching surface 113. As shown in FIG. 4, in the fingerprint identification process, the finger F presses the touch surface 113 of the foldable display apparatus 1. In some embodiments of the present disclosure, the object distance refers to a distance between the touch surface 113 of the foldable display apparatus 1 and the imaging hole 111 in the thickness direction of the display panel 11, and the image distance refers to a distance between the imaging hole 111 and the touch surface 113 of the foldable display apparatus 1 in the thickness direction of the display panel 11.

In step S124, the quantity difference ΔN is determined according to the object distance change amount ΔT1 and the image distance change amount ΔT2. In some embodiments of the present disclosure, a fingerprint pressing region in the touching surface 113 has a fixed size, and the size of the image formed by the imaging hole 111 is calculated according to the pinhole imaging principle and the object distance and the image distance of the imaging hole 111 in the current folded state. The number of sensing element 121 in the target sensing element group 12A corresponding to the imaging hole 111 is determined according to the size of the image.

It should be noted that the sequence of step S123 and step S121 is not limited in embodiments of the present disclosure. For example, step S123 may be performed to obtain the object distance change amount ΔT1 and the image distance change amount ΔT2, and then step S121 is performed to obtain the displacement of the imaging hole 111 with respect to a preset reference point. In some embodiments of the present disclosure, step S121 is performed, and then step S123 is performed. In some embodiments of the present disclosure, step S121 and step S123 are performed at the same time.

In some embodiments of the present disclosure, the display panel 11 further includes a first layer, and the first layer is positioned between the touching surface 113 and the sensing element 121. For example, the first layer may be any layer between the touching surface 113 and the sensing element 121, or two or more layers between the touching surface 113 and the sensing element 121. The thickness of the first layer affects the object distance and the image distance of the imaging hole 111.

Figure 8:
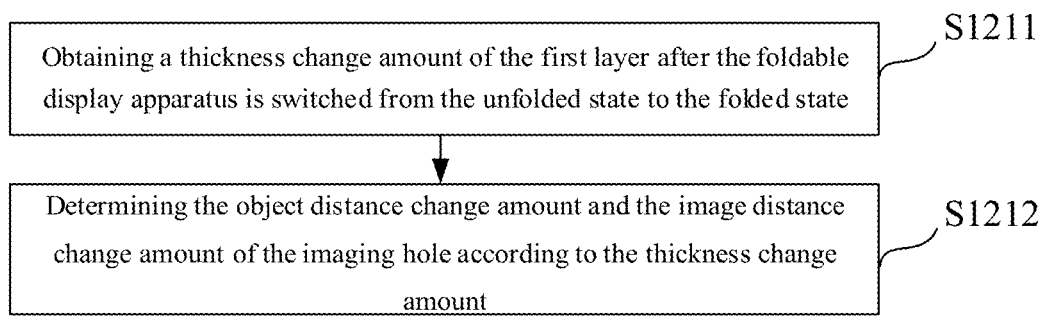
FIG. 8 is a flow chart of another calibration method for fingerprint detection of a foldable display apparatus according to some embodiments of the present disclosure.

FIG. 8 is a flow chart of another calibration method for fingerprint identification of a foldable display apparatus according to some embodiments of the present disclosure. In some embodiments of the present disclosure, as shown in FIG. 4 and FIG. 8, step S123 of obtaining the object distance change amount ΔT1 and the image distance change amount ΔT2 of the imaging hole 111 includes the following steps.

In step S1211, after the foldable display apparatus 1 is switched from the unfolded state to the current folded state, a thickness change amount ΔT of the first layer in the folding process is obtained. FIG. 4 shows an example in which the first layer 3 includes a first sub-layer 31, a second sub-layer 32, a light-blocking layer 110, and a third sub-layer 33. The first sub-layer 31 and the second sub-layer 32 are positioned between the touching surface 113 and the imaging holes 111, and the third sub-layer 33 is positioned between the imaging holes 111 and the sensing element 121. As shown in FIG. 4, the thickness of the first layer 3 when the foldable display apparatus 1 is in the unfolded state is T0, the thickness of the first layer 3 when the foldable display apparatus 1 is in the current folded state is T1, and ΔT=T1−T0. In an example embodiment, the first sub-layer 31 is a cover plate.

In step S1212, the object distance change amount ΔT1 and the image distance change amount ΔT2 of the imaging hole 111 are determined according to the thickness change amount ΔT. As shown in FIG. 4, the object distance change amount ΔT1 is the sum of the thickness change amounts of the first sub-layer 31 and the second sub-layer 32 between the imaging holes 111 and the sensing element 121. The image distance change amount ΔT2 is the thickness change amount of the third sub-layer 33 between the imaging holes 111 and the sensing element 121. The object distance change amount ΔT1 and the change amount ΔT2 may be determined according to the thickness change amount ΔT by multiple methods. For example, as shown in FIG. 4, the first layer 3 includes all layers between the touching surface 113 and the sensing element 121, and the thickness of the first layer 3 is the sum of the thicknesses of the first sub-layer 31, the second sub-layer 32, the light-blocking layer 110, and the third sub-layer 33. The thickness change amount ΔT of the first layer 3 reflects the thickness change amount of the first sub-layer 31, the thickness change amount of the second sub-layer 32, and the thickness change amount of the third sub-layer 33. For example, the proportion of the thickness of the first sub-layer 31 in the thickness of the first layer 3 is X1, the proportion of the thickness of the second sub-layer 32 in the thickness of the first layer 3 is X2, the proportion of the thickness of the third sub-layer 33 in the thickness of the first layer 3 is X3, the light-blocking layer 110 has a small thickness, and the proportion of the thickness of the light-blocking layer 110 in the thickness of the first layer 3 is approximately ignored. The proportions X1, X2, and X3 of the first sub-layer 31, the second sub-layer 32, and the third sub-layer 33 in the first layer 3 are approximately not changed after the foldable display apparatus 1 is folded. The object distance change amount ΔT1 equals to the sum of the thickness change amount of the first sub-layer 31 and the thickness change amount of the second sub-layer 32. The image distance change amount ΔT2 equals to the thickness change amount of the third sub-layer 33. The thickness change amount of the first sub-layer 31 is $(T1-T0)*X1$, the thickness change amount of the second sub-layer 32 is (T1−T0)*X2, and the thickness change amount of the third sub-layer 33 is (T1−T0)*X3. In some embodiments of the present disclosure, the object distance change amount ΔT1 and the image distance change amount ΔT2 may be obtained according to the thickness change amount ΔT using other method, which are not described in details in embodiments of the present disclosure.

In some embodiments of the present disclosure, the object distance change amount ΔT1 and the image distance change amount ΔT2 are obtained according to the thickness change amount ΔT of the first layer 3 that already exists in the display panel 11, without adding a structure for obtaining the object distance change amount ΔT1 and the image distance change amount ΔT2. In this way, the precision of the fingerprint imaging and the accuracy of the fingerprint identification when the foldable display apparatus are improved, and the structure of the display panel 11 is simplified.

Figure 9:
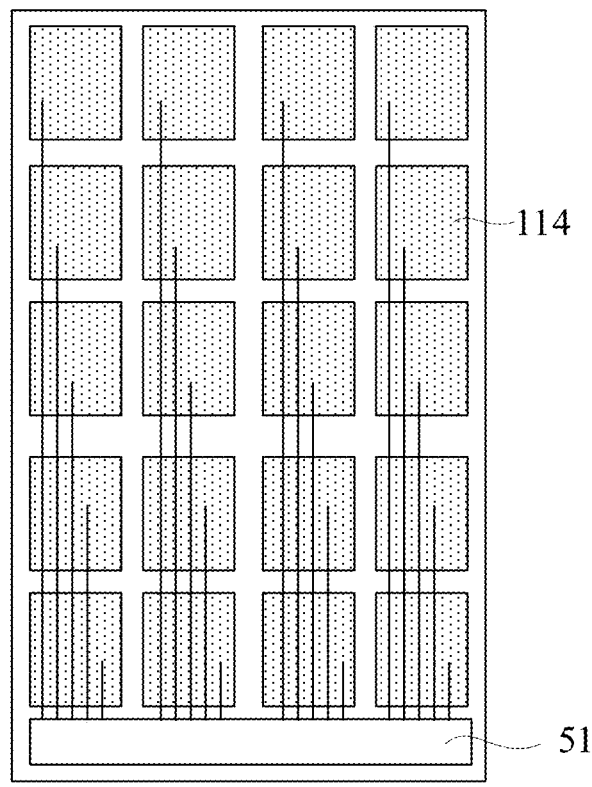
FIG. 9 is a schematic diagram of a foldable display apparatus including a touch electrode according to some embodiments of the present disclosure.
Figure 10:
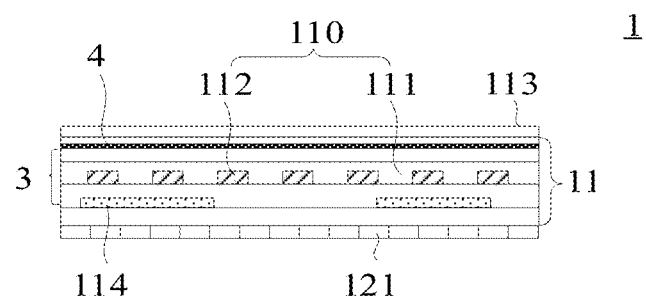
FIG. 10 is a cross-sectional view of the foldable display apparatus shown in FIG. 9 according to some embodiments of the present disclosure.

FIG. 9 is a schematic diagram of a foldable display apparatus including a touch electrode according to some embodiments of the present disclosure. FIG. 10 is a cross-sectional view of the foldable display apparatus shown in FIG. 9. In some embodiments of the present disclosure, as shown in FIG. 9 and FIG. 10, the foldable display apparatus 1 further includes a touch electrode. FIG. 10 shows an example embodiment in which the touch electrode 114 is positioned on a side of the imaging holes 111 away from the touch surface 113. In another example embodiment, the touch electrode 114 is positioned on a side of the imaging holes 111 adjacent to the touch surface 113. Embodiments of the present disclosure do not limit the relative position relationship between the touch electrode 114 and the imaging holes 111. A self-capacitance C1 between the touch electrode 114 and a reference voltage terminal is associated with the thickness of the first layer 3. An electric field line of an electric field between the touch electrode 114 and the reference voltage terminal passes through the first layer 3. The self-capacitance C1 between the touch electrode 114 and the reference voltage terminal approximately equals to a sum of the parasitic capacitances between the touch electrode 114 and other structures in the foldable display apparatus 1, and the parasitic capacitance between the touch electrode 114 and a cathode 4 in the display panel 11 accounts for the largest proportion. Herein, an insulation layer between the touch electrode 114 and the cathode 4 in the display panel 11 is regarded as the first layer 3. The cathode 4 and an anode (not shown) are configured to supply a voltage to a light-emitting material (not shown). When the foldable display apparatus 1 is bent, the first layer 3 is stretched or compressed, the thickness of the first layer 3 is changed, and thus the parasitic capacitance value between the touch electrode 114 and a cathode 4 in the display panel 11 is changed.

Figure 11:
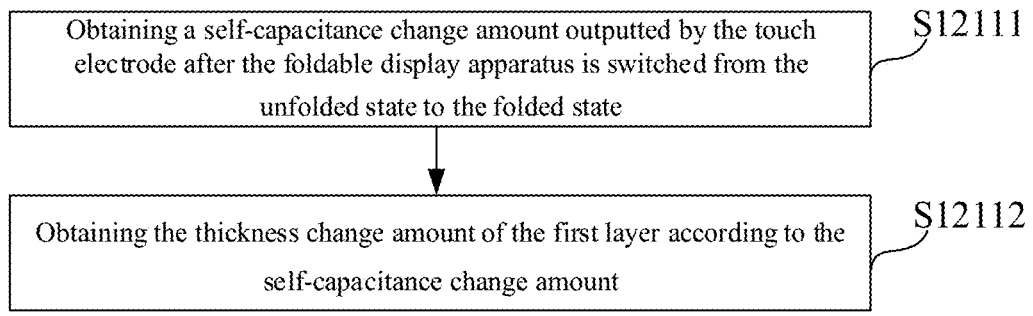
FIG. 11 is a flow chart of another calibration method for fingerprint detection of a foldable display apparatus according to some embodiments of the present disclosure.

FIG. 11 is a flow chart of another calibration method for fingerprint identification of a foldable display apparatus according to some embodiments of the present disclosure. In some embodiments of the present disclosure, as shown in FIG. 11, step S1211 of obtaining the thickness change amount ΔT of the first layer 3 includes the following steps.

In step S12111, after the foldable display apparatus 1 is switched from the unfolded state to the folded state, a self-capacitance change amount ΔC1 outputted by the touch electrode 114 is obtained. For example, as shown in FIG. 9, the foldable display apparatus 1 further includes a first fingerprint calibration control unit 51 electrically connected to the touch electrode 114. In the fingerprint detection calibration process, the first fingerprint calibration control unit 51 generates a calibration driving signal, and the calibration driving signal is supplied to the touch electrode 114. After the foldable display apparatus 1 is switched from the unfolded state to the folded state, the touch electrode 114, driven by the calibration driving signal, outputs the self-capacitance change amount ΔC1.

In step S12112, the thickness change amount ΔT of the first layer 3 is determined according to the self-capacitance change amount ΔC1.

For example, the foldable display apparatus 1 further includes a first touch sensing control unit electrically connected to the touch electrode 114. In some embodiments of the present disclosure, when the foldable display apparatus 1 is not performing the fingerprint detection calibration, the touch sensing operation is performed using the touch electrode 114. For example, during the touch sensing operation, the first touch sensing control unit generates a touch driving signal and supplies the touch driving signal to the touch electrode 114. The self-capacitance of the touch electrode 114 when no touch operation is performed by a touching object (such as a finger F or a stylus) on the foldable display apparatus 1 is different from the self-capacitance of the touch electrode 114 when the touch operation is performed by a touching object (such as a finger F or a stylus) on the foldable display apparatus 1, and the first touch sensing control unit determines, according to the self-capacitance change amount ΔC1 outputted by the touch electrode 114, whether the touch operation exists and the touch position.

In some embodiments of the present disclosure, the first touch sensing control unit may be reused as the first fingerprint calibration control unit 51.

It should be noted that, in the fingerprint detection calibration process, no touch operation is performed on the foldable display apparatus 1 so as to prevent the self-capacitance change being affected by other factors. In this way, it is ensured that the self-capacitance change amount ΔC1 detected in the fingerprint detection calibration process is caused only by the folding operation.

In the fingerprint detection calibration method provided by embodiments of the present disclosure, the display panel 11 includes the touch electrode 114. Therefore, the display panel 11 has the touch function, and the fingerprint detection of the display panel 11 is calibrated using the change of the electric field between the touch electrode 114 and the reference voltage terminal caused by the folding operation. In this way, the precision of the fingerprint imaging and the accuracy of the fingerprint identification when the foldable display apparatus are improved, and the structure of the display panel 11 is simplified.

In some embodiments of the present disclosure, as shown in FIG. 9, the foldable display apparatus 1 includes a plurality of touch electrodes 114. The touch electrode 114 in the step S12111 of obtaining the self-capacitance change amount ΔC1 outputted by the touch electrode 114 refers to the touch electrode 114 among the plurality of touch electrodes 114 that overlaps the to-be-determined imaging hole 111 in the thickness direction of the display panel 11.

In some embodiments of the present disclosure, a material of the touch control electrode 114 includes transparent metal oxide. In this way, the light transmittance of the touch electrode 114 is ensured, and the intensity of the fingerprint reflection light that passes through the imaging hole 111 and is received by the sensing element 121 is not affected.

In some embodiments of the present disclosure, the fingerprint identification sensor further includes a first register, and a first mapping relationship $f_1$ between the self-capacitance change amount ΔC1 and the thickness change amount ΔT is stored in the first register in advance.

The step S12112 of determining the thickness change amount ΔT of the first layer 3 according to the self-capacitance change amount ΔC1 includes: searching, in the first mapping relationship $f_1$, for the thickness change amount ΔT according to the self-capacitance change amount ΔC1.

Based on this arrangement, in the process of determining the thickness change amount ΔT, the thickness change amount ΔT corresponding to the current self-capacitance change amount ΔC1 is determined quickly by accessing the first mapping relationship $f_1$. There is no need to calculate the thickness change amount ΔT corresponding to the current self-capacitance change amount ΔC1 every time, improving the calibration efficiency of the fingerprint detection.

In some embodiments of the present disclosure, the first mapping relationship $f_1$ may be obtained by multiple measurements. In each measurement, the foldable display apparatus 1 is bent by a certain angle, the self-capacitance change amount ΔC1 outputted by the touch electrode 114 at each position when the foldable display apparatus 1 is bent by the current angle is obtained, and the thickness change amount ΔT at each position of the first layer 3 when the foldable display apparatus 1 is bent by the current angle is measured. After multiple measurements, the first mapping relationship $f_1$ between the self-capacitance change amount ΔC1 and the thickness change amount ΔT is obtained. In the manufacturing of the foldable display apparatus 1, the first mapping relationship $f_1$ is stored in the first register.

In some embodiments of the present disclosure, in the fingerprint detection calibration process, if the actually detected self-capacitance change amount ΔC1 is not included in the first mapping relationship $f_1$, two self-capacitance change amounts in the first mapping relationship $f_1$ close to the actually detected self-capacitance change amount ΔC1 are obtained and used. The thickness change amounts ΔT corresponding to the two self-capacitance change amounts in the first mapping relationship $f_1$ are obtained, and the thickness change amount ΔT corresponding to the actually detected self-capacitance change amount ΔC1 is determined by an interpolation operation on the two thickness change amounts ΔT.

Figure 12:
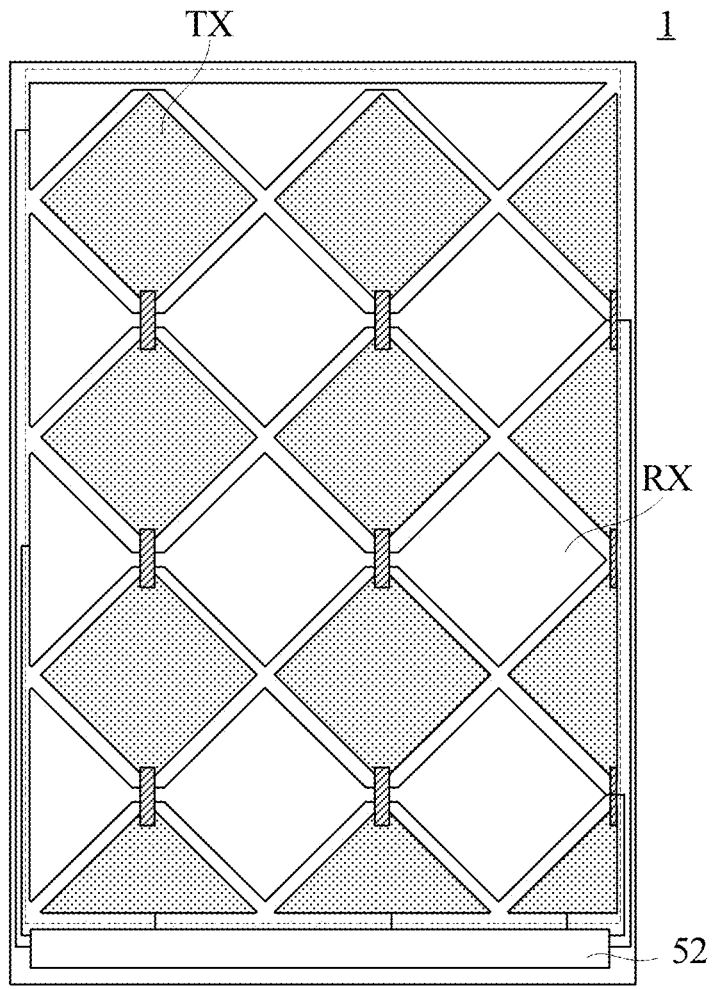
FIG. 12 is a schematic diagram of a foldable display apparatus including a touch sensing electrode and a touch driving electrode according to some embodiments of the present disclosure.
Figure 13:
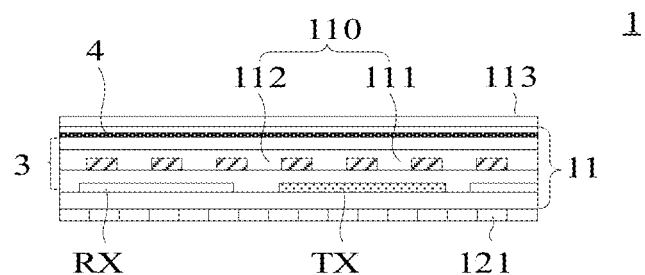
FIG. 13 is a cross-sectional view of the foldable display apparatus shown in FIG. 12 according to some embodiments of the present disclosure.

In some embodiments of the present disclosure, the foldable display apparatus 1 includes a touch sensing electrode and a touch driving electrode. FIG. 12 is a schematic diagram of a foldable display apparatus including a touch sensing electrode and a touch driving electrode according to some embodiments of the present disclosure. FIG. 13 is a cross-sectional view of the foldable display apparatus shown in FIG. 12. In the example embodiment shown in FIG. 13, the touch sensing electrode RX and the touch driving electrode TX are arranged in a same layer located on a side of the imaging holes 111 away from the touch surface 113. In some embodiments of the present disclosure, the touch driving electrode TX and/or the touch sensing electrode RX is located on a side of the imaging holes 111 adjacent to the touch surface 113. Embodiments of the present disclosure do not limit the relative position relationship between the touch driving electrode TX and the imaging hole 111 and the relative position relationship between the touch sensing electrode RX and the imaging hole 111. A mutual capacitance between the touch driving electrode TX and the touch sensing electrode RX is associated with the thickness of the first layer 3. The electric field line between the touch driving electrode TX and the touch sensing electrode RX of the foldable display apparatus 1 passes through the first layer 3.

Figure 14:
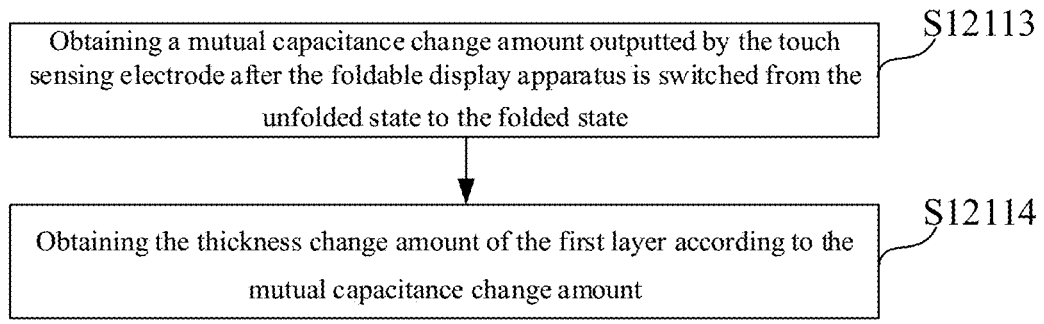
FIG. 14 is a flow chart of another calibration method for fingerprint detection of a foldable display apparatus according to some embodiments of the present disclosure.

FIG. 14 is a flow chart of another calibration method for fingerprint identification of a foldable display apparatus according to some embodiments of the present disclosure. As shown in FIG. 14, the step S1211 of obtaining the thickness change amount ΔT of the first layer 3 includes the following steps.

In step S12113, after the foldable display apparatus 1 is switched from the unfolded state to the folded state, a mutual capacitance change amount ΔC2, in the folding process, outputted by the touch sensing electrode RX is obtained. For example, as shown in FIG. 12, the foldable display apparatus 1 further includes a second fingerprint calibration control unit 52 electrically connected to the touch driving electrode TX and the touch sensing electrode RX. In the fingerprint detection calibration process, the second fingerprint calibration control unit 52 generates a calibration driving signal, and the calibration driving signal is supplied to the touch driving electrode TX. After the foldable display apparatus 1 is switched from the unfolded state to the folded state, the touch sensing electrode RX outputs the mutual capacitance change amount ΔC2.

In step S12114, the thickness change amount ΔT of the first layer 3 is determined according to the mutual capacitance change amount ΔC2.

For example, the foldable display apparatus 1 further includes a second touch sensing control unit electrically connected to the touch driving electrode TX and the touch driving electrode RX. In some embodiments of the present disclosure, when the foldable display apparatus 1 is not performing the fingerprint detection calibration, the touch sensing operation is performed using the touch driving electrode TX and the touch sensing electrode RX. For example, during the touch sensing operation, the second touch sensing control unit generates a touch driving signal and supplies the touch driving signal to the touch driving electrode TX. The mutual capacitance between the touch driving electrode TX and the touch sensing electrode RX when no touch operation is performed by a touching object (such as a finger F or a stylus) on the foldable display apparatus 1 is different from the mutual capacitance between the touch driving electrode TX and the touch sensing electrode RX when the touch operation is performed by a touching object (such as a finger F or a stylus) on the foldable display apparatus 1. The second touch sensing control unit determines, according to the mutual capacitance change amount ΔC2 outputted by the touch sensing electrode RX, whether the touch operation exists and the touch position.

In some embodiments of the present disclosure, the second touch sensing control unit may be reused as the second fingerprint calibration control unit 52.

It should be noted that, in the fingerprint detection calibration process, no touch operation is performed on the foldable display apparatus 1 so as to prevent the mutual capacitance change being affected by other factors. In this way, it is ensured that the mutual capacitance change amount ΔC2 detected in the fingerprint detection calibration process is caused only by the folding operation.

In the fingerprint detection calibration method provided by embodiments of the present disclosure, the display panel 11 includes the touch driving electrode TX and the touch sensing electrode RX. Therefore, the display panel 11 has the touch function, and the fingerprint detection of the display panel 11 is calibrated using the change of the electric field between the touch driving electrode TX and the touch sensing electrode RX caused by the folding operation. In this way, the precision of the fingerprint imaging and the accuracy of the fingerprint identification when the foldable display apparatus are improved, and the structure of the display panel 11 is simplified.

In some embodiments of the present disclosure, as shown in FIG. 12, the foldable display apparatus 1 includes a plurality of touch driving electrodes TX and a plurality of touch sensing electrodes RX. The touch sensing electrode RX in the step S12113 of obtaining the mutual capacitance change amount $\Delta C2$ outputted by the touch sensing electrode RX refers to the touch sensing electrode RX among the plurality of touch sensing electrodes RX that overlaps the to-be-determined imaging hole 111 in the thickness direction of the display panel 11.

In some embodiments of the present disclosure, both the touch driving electrode TX and the touch sensing electrode RX are made of transparent metal oxide. In this way, the light transmittance of the touch driving electrode TX and the touch sensing electrode RX is ensured, and the intensity of the fingerprint reflection light that passes through the imaging hole 111 and is received by the sensing element 121 is not affected.

In some embodiments of the present disclosure, the fingerprint identification sensor further includes a second register, and a second mapping relationship $f_2$ between the mutual capacitance change amount $\Delta C2$ and the thickness change amount $\Delta T$ is stored in the second register in advance.

The step S12114 of obtaining the thickness change amount $\Delta T$ of the first layer 3 according to the mutual capacitance change amount $\Delta C2$ includes searching, in the second mapping relationship $f_2$, for the thickness change amount $\Delta T$ according to the mutual capacitance change amount $\Delta C2$.

Based on this arrangement, in the process of determining the thickness change amount $\Delta T$, the thickness change amount $\Delta T$ corresponding to the current mutual capacitance change amount $\Delta C2$ is determined quickly by accessing the second mapping relationship $f_2$. There is no need to calculate the thickness change amount $\Delta T$ corresponding to the current mutual capacitance change amount $\Delta C2$ every time, improving the calibration efficiency of the fingerprint detection.

In some embodiments of the present disclosure, the second mapping relationship $f_2$ may be obtained by multiple measurements. In each measurement, the foldable display apparatus 1 is bent by a certain angle, the mutual capacitance change amount $\Delta C2$ outputted by the touch sensing electrode RX at each position corresponding to the current angle is obtained, and the thickness change amount $\Delta T$ at each position of the first layer 3 corresponding to the current angle is measured. After multiple measurements, the second mapping relationship $f_2$ between the mutual capacitance change amount $\Delta C2$ and the thickness change amount $\Delta T$ is obtained. In the manufacturing of the foldable display apparatus 1, the second mapping relationship $f_2$ is stored in the second register.

In some embodiments of the present disclosure, in the fingerprint detection calibration process, if the actually detected mutual capacitance change amount $\Delta C2$ is not included in the second mapping relationship $f_2$, two mutual capacitance change amounts in the second mapping relationship $f_2$ close to the actually detected mutual capacitance change amount $\Delta C2$ are obtained and used. Two thickness change amounts $\Delta T$ corresponding to the two mutual capacitance change amounts in the second mapping relationship $f_2$ are obtained, and the thickness change amount $\Delta T$ corresponding to the actually detected mutual capacitance change amount $\Delta C2$ is determined by an interpolation operation on the two thickness change amounts $\Delta T$.

In some embodiments of the present disclosure, as shown in FIG. 4, the display panel 11 includes a plurality of imaging holes 111. Different imaging holes 111 correspond to different target sensing element groups 12A at different positions. FIG. 4 shows one imaging hole 111 for illustration. Based on the calibration method for fingerprint detection provided by embodiments of the present disclosure, the corresponding target sensing element group 12A is determined for each imaging hole 111 in the current folded state. In the current folded state, in the fingerprint identification process, imaging for each imaging hole 111 is performed based on the signal fed back by the corresponding target sensing element group 12A in the current folded state. Subsequently, the images corresponding to the imaging holes 111 are combined to obtain a complete fingerprint image corresponding to the obtained fingerprint information.

Embodiments of the present disclosure further provide a foldable display apparatus 1. As shown in FIG. 1, FIG. 2, and FIG. 4, the foldable display apparatus 1 includes a display panel 11 and a fingerprint identification sensor. The fingerprint identification sensor includes a plurality of sensing elements 121. The display panel 11 includes a plurality of imaging holes 111.

Figure 15:
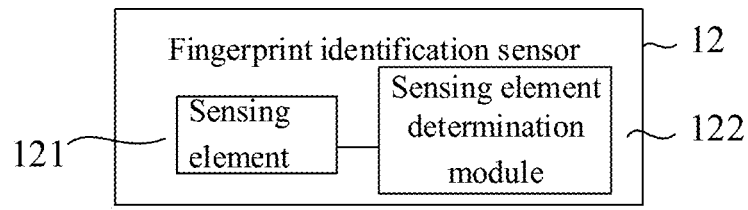
FIG. 15 is a schematic block diagram of a fingerprint identification sensor according to some embodiments of the present disclosure.

FIG. 15 is a schematic block diagram of a fingerprint identification sensor according to some embodiments of the present disclosure. As shown in FIG. 15, the fingerprint identification sensor 12 further includes a sensing element determination module 122. The sensing element determination module 122 is electrically connected to the sensing element 121. The sensing element determination module 122 is configured to, after the foldable display apparatus 1 is switched from an unfolded state to a folded state, determine a target sensing element group 12A corresponding to the imaging hole 111 when the foldable display apparatus 1 is in the current folded state. The target sensing element group 12A includes a target number N1 of sensing element, a center of the target sensing element group 12A is located a target position L1, and the target number N1 is an integer greater than or equal to 1.

The sensing element determination module 122 is further configured to, in the folded state, image a fingerprint pattern based on a signal fed back by the target sensing element group 12A corresponding to the imaging hole 111.

For example, when the fingerprint detection is performed on the foldable display apparatus 1 in the folded state, the sensing element determination module 122 determines the target sensing element group 12A corresponding to the imaging hole 111, and then, after a finger F presses a touch surface of the foldable display apparatus 1, the fingerprint pattern is imaged using the signal fed back by the target sensing element group 12A.

In the foldable display apparatus 1 provided by embodiments of the present disclosure, the fingerprint identification sensor 12 further includes the sensing element determination module 122. The sensing element determination module 122 determines a target sensing element group 12A corresponding to the imaging hole 111 when the foldable display apparatus 1 is in the current folded state. Subsequently, when the fingerprint identification is performed in the folded state, the sensing element determination module 122 images the fingerprint pattern based on the signal fed back by the target sensing element group 12A corresponding to the imaging hole 111, thereby improving the accuracy of the fingerprint identification.

In some embodiments of the present disclosure, the fingerprint identification sensor 12 further includes a storage unit. After the target sensing element group 12A corresponding to the imaging hole 111 is obtained by the sensing element determination module 122, the correspondence relationship between the imaging hole 111 and the target sensing element group 12A in the current folded state is stored in the storage unit. When the fingerprint identification is performed in the current folded state, the target sensing element group 12A corresponding to the imaging hole 111 can be quickly determined according to the correspondence relationship between the imaging hole 111 and the target sensing element group 12A stored in the storage unit. In this way, the sensing element determination module 122 can image the fingerprint pattern corresponding to the imaging hole 111 using the signal fed back by the correct target sensing element group 12A.

Figure 16:
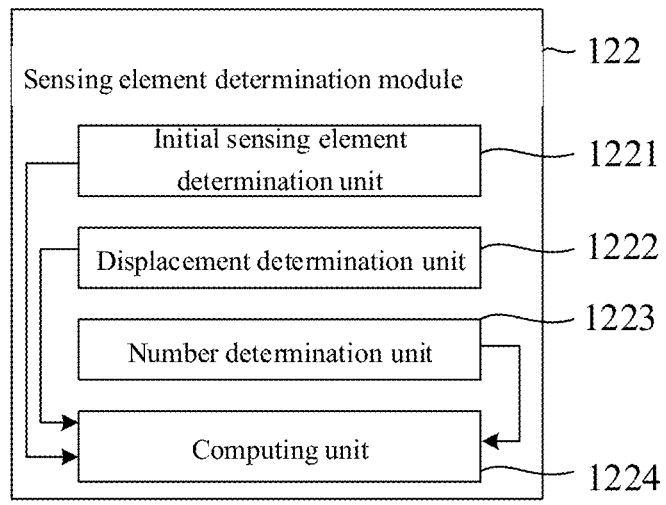
FIG. 16 is a schematic block diagram of a sensing element determination module according to some embodiments of the present disclosure.

FIG. 16 is a schematic block diagram of a sensing element determination module according to some embodiments of the present disclosure. In some embodiments of the present disclosure, as shown in FIG. 16, the sensing element determination module 122 includes an initial sensing element determination unit 1221, a displacement determination unit 1222, a number determination unit 1223, and a computing unit 1224. The initial sensing element determination unit 1221, the displacement determination unit 1222, and the number determination unit 1223 are all electrically connected to the computing unit 1224.

As shown in FIG. 4, the initial sensing element determination unit 1221 is configured to obtain an initial sensing element group 12B corresponding to the imaging hole 111 when the foldable display apparatus 1 is in the unfolded state. The initial sensing element group 12B an initial number N0 of sensing element 121, a center of the initial sensing element group 12B is located an initial position L0, and the initial number N0 is an integer greater than or equal to 1. For example, information regarding the initial sensing element group 12B corresponding to the imaging hole 111 when the foldable display apparatus 1 is in the unfolded state may be stored in a storage unit in advance. The initial sensing element determination unit 1221 obtains initial sensing element groups 12B corresponding to different imaging holes 111 according to the correspondence relationship between the initial sensing element groups 12B and the imaging holes 111 in the unfolded state stored in the storage unit.

The displacement determination unit 1222 is configured to determine a displacement S of the target position L1 with respect to the initial position L0 according to a bending angle of the display panel 11 when the foldable display apparatus 1 is in the folded state. The number determination unit 1223 is configured to determine a difference ΔN between the initial number N0 and the target number N1 according to the bending angle of the display panel 11 when the foldable display apparatus 1 is in the folded state. The foldable display apparatus 1 is deformed when being folded. A deformation degree of a layer in the foldable display apparatus 1 is different when the foldable display apparatus 1 is bent by different angles. Accordingly, the correspondence relationship between the imaging holes 111 and the sensing element 121 is changed. In some embodiments of the present disclosure, the displacement S and the quantity difference ΔN may be measured in advance for multiple different bending angles, and the correspondence relationship between the bending angle and the displacement S and the correspondence relationship between the bending angle and the quantity difference ΔN are obtained. In some embodiments of the present disclosure, the displacement S of the target position L1 with respect to the initial position L0 may be determined by other methods.

The computing unit 1224 is configured to determine the target sensing element group 12A according to the initial number N0, the initial position L0, the displacement S, and the difference ΔN between the initial number N0 and the target number N1. The center of the target sensing element group 12A is at the target position L1, and the number N1 of the sensing element 121 in the target sensing element group 12A is the target number N1.

Figure 17:
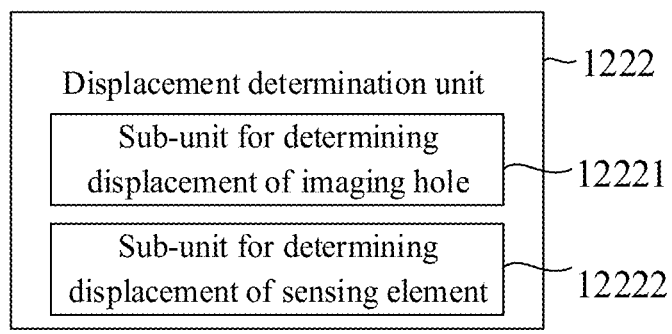
FIG. 17 is a schematic block diagram of a displacement determination unit according to some embodiments of the present disclosure.

FIG. 17 is a schematic block diagram of a displacement determination unit according to some embodiments of the present disclosure. In some embodiments of the present disclosure, as shown in FIG. 17, the displacement determination unit 1222 includes a sub-unit 12221 for determining a displacement of an imaging hole and a sub-unit 12222 for determining a displacement of a sensing element.

The sub-unit 12221 for determining a displacement of an imaging hole is configured to determine a displacement of the imaging hole 111 with respect to a preset reference point after the foldable display apparatus 1 is switched from the unfolded state to the folded state. For example, the preset reference point is the geometric center of the plane where the imaging hole 111 is located, or any point of the plane where the imaging hole 111 is located, or a position easy to determine, which is not limited in embodiments of the present disclosure.

As shown in FIG. 4, the sub-unit 12222 for determining a displacement of a sensing element is configured to determine the displacement ΔL of the target position L1 with respect to the initial position L0 according to the displacement of the imaging hole 111. In the current folded state, the center (the target position L1) of the target sensing element group 12A overlaps the center of the imaging hole 111 in the thickness direction of the display panel 11. The sensing element 121 at the target position L1 receives light with the largest intensity and generates the electrical signal with the largest magnitude among the target sensing element group 12A when the foldable display apparatus is in the folded state.

Figure 18:
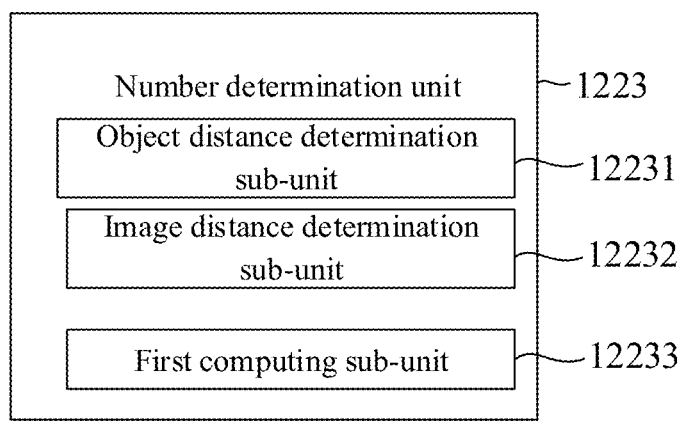
FIG. 18 is a schematic block diagram of a number determination unit according to some embodiments of the present disclosure.

FIG. 18 is a schematic block diagram of a number determination unit according to some embodiments of the present disclosure. In some embodiments of the present disclosure, as shown in FIG. 18, the number determination unit 1223 includes an object distance determination sub-unit 12231, an image distance determination sub-unit 12232, and a first computing sub-unit 12233.

The object distance determination sub-unit 12231 is configured to obtain an object distance change amount ΔT1 of the imaging hole 111 after the foldable display apparatus 1 is switched from the unfolded state to the folded state. The image distance determination sub-unit 12232 is configured to obtain an image distance change amount ΔT2 of the imaging hole 111 after the foldable display apparatus 1 is switched from the unfolded state to the folded state.

The first computing sub-unit 12233 is configured to determine the difference ΔN between the initial number N0 and the target number N1 according to the object distance change amount ΔT1 and the image distance change amount ΔT2.

Figure 19:
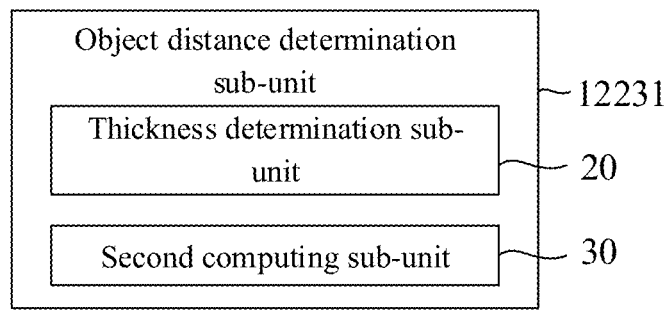
FIG. 19 is a schematic block diagram of an object distance determination sub-unit according to some embodiments of the present disclosure.
Figure 20:
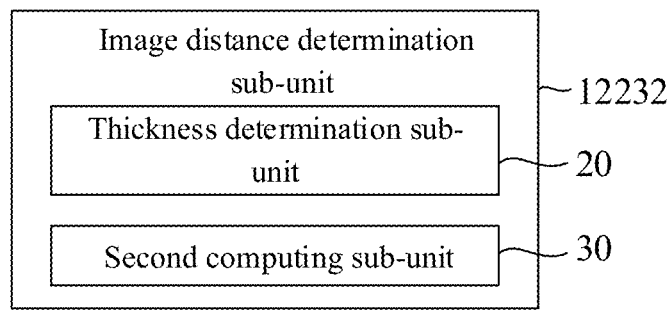
FIG. 20 is a schematic block diagram of an image distance determination sub-unit according to some embodiments of the present disclosure.

FIG. 19 is a schematic block diagram of an object distance determination sub-unit according to some embodiments of the present disclosure. FIG. 20 is a schematic block diagram of an image distance determination sub-unit according to some embodiments of the present disclosure. In some embodiments of the present disclosure, as shown in FIG. 19 and FIG. 20, each of the object distance determination sub-unit 12231 and the image distance determination sub-unit 12232 includes a thickness determination sub-unit 20 and a second computing sub-unit 30.

The thickness determination sub-unit 20 is configured to obtain a thickness change amount $\Delta T$ of the first layer 3 after the foldable display apparatus 1 is switched from the unfolded state to the folded state. The second computing sub-unit 30 is configured to determine the object distance change amount $\Delta T1$ and the image distance change amount $\Delta T2$ of the imaging hole 111 according to the thickness change amount $\Delta T$.

In some embodiments of the present disclosure, the object distance change amount $\Delta T1$ and the image distance change amount $\Delta T2$ are obtained according to the thickness change amount $\Delta T$ of the first layer 3 that already exists in the display panel 11, without adding a structure for obtaining the object distance change amount $\Delta T1$ and the image distance change amount $\Delta T2$. In this way, the precision of the fingerprint imaging and the accuracy of the fingerprint identification when the foldable display apparatus are improved, and the structure of the display panel 11 is simplified.

In some embodiments of the present disclosure, as shown in FIG. 9 and FIG. 10, the foldable display apparatus 1 further includes a touch electrode 114. A self-capacitance C1 of the touch electrode 114 to the reference voltage terminal is associated with the thickness of the first layer 3. An electric field line of an electric field between the touch electrode 114 and the reference voltage terminal passes through the first layer 3.

Figure 21:
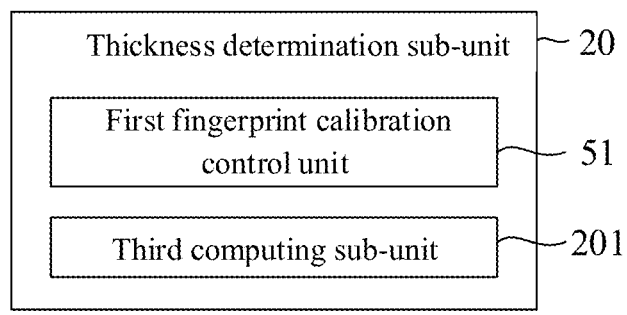
FIG. 21 is a schematic block diagram of a thickness determination sub-unit according to some embodiments of the present disclosure.

FIG. 21 is a schematic block diagram of a thickness determination sub-unit according to some embodiments of the present disclosure. In some embodiments of the present disclosure, as shown in FIG. 21, the thickness determination sub-unit 20 includes the above first fingerprint calibration control unit 51 and a third computing sub-unit 201. In the fingerprint detection calibration process, the first fingerprint calibration control unit 51 generates a calibration driving signal, and the calibration driving signal is supplied to the touch electrode 114. After the foldable display apparatus 1 is switched from the unfolded state to the folded state, the touch electrode 114, driven by the calibration driving signal, outputs the self-capacitance change amount $\Delta C1$ to the third computing sub-unit 201. The third computing sub-unit 201 is configured to obtain the thickness change amount $\Delta T$ of the first layer 3 according to the self-capacitance change amount $\Delta C1$.

In some embodiments of the present disclosure, the fingerprint identification sensor further includes a first register, and a first mapping relationship $f_1$ between the self-capacitance change amount $\Delta C1$ and the thickness change amount $\Delta T$ is stored in the first register in advance. The third computing sub-unit 201 includes a first mapping sub-unit configured to search, in the first mapping relationship $f_1$, for the thickness change amount $\Delta T$ according to the self-capacitance change amount $\Delta C1$.

Based on this arrangement, in the process of determining the thickness change amount $\Delta T$, the thickness change amount $\Delta T$ corresponding to the current self-capacitance change amount $\Delta C1$ is determined quickly by accessing the first mapping relationship $f_1$. There is no need to calculate the thickness change amount $\Delta T$ corresponding to the current self-capacitance change amount $\Delta C1$ every time, improving the calibration efficiency of the fingerprint detection.

In some embodiments of the present disclosure, the first mapping relationship $f_1$ may be obtained by multiple measurements. In each measurement, the foldable display apparatus 1 is bent by a certain angle, the self-capacitance change amount $\Delta C1$ outputted by the touch electrode 114 at each position when the foldable display apparatus 1 is bent by the current angle is obtained, and the thickness change amount $\Delta T$ at each position of the first layer 3 when the foldable display apparatus 1 is bent by the current angle is measured. After multiple measurements, the first mapping relationship $f_1$ between the self-capacitance change amount $\Delta C1$ and the thickness change amount $\Delta T$ is obtained. In the manufacturing of the foldable display apparatus 1, the first mapping relationship $f_1$ is stored in the first register.

In some embodiments of the present disclosure, in the fingerprint detection calibration process, if the actually detected self-capacitance change amount $\Delta C1$ is not included in the first mapping relationship $f_1$, two self-capacitance change amounts in the first mapping relationship $f_1$ close to the actually detected self-capacitance change amount $\Delta C1$ are obtained and used. The thickness change amounts $\Delta T$ corresponding to the two self-capacitance change amounts in the first mapping relationship $f_1$ are obtained, and the thickness change amount $\Delta T$ corresponding to the actually detected self-capacitance change amount $\Delta C1$ is determined by an interpolation operation on the two thickness change amounts $\Delta T$.

In some embodiments of the present disclosure, as shown in FIG. 12 and FIG. 13, the foldable display apparatus 1 includes a touch driving electrode TX and a touch sensing electrode RX. A mutual capacitance between the touch driving electrode TX and the touch sensing electrode RX is associated with the thickness of the first layer 3. The electric field line between the touch driving electrode TX and the touch sensing electrode RX of the foldable display apparatus 1 passes through the first layer 3.

Figure 22:
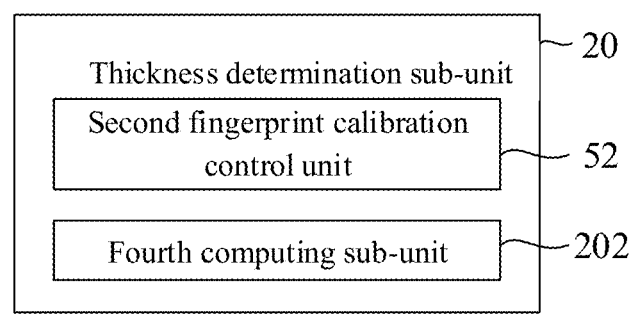
FIG. 22 a schematic block diagram of a thickness determination sub-unit according to some embodiments of the present disclosure.

FIG. 22 a schematic block diagram of another thickness determination sub-unit according to some embodiments of the present disclosure. In some embodiments of the present disclosure, the thickness determination sub-unit 20 includes the above second fingerprint calibration control unit 52 and a fourth computing sub-unit 202. In the fingerprint detection calibration process, the second fingerprint calibration control unit 52 generates a calibration driving signal, and the calibration driving signal is supplied to the touch driving electrode TX. After the foldable display apparatus 1 is switched from the unfolded state to the folded state, the touch sensing electrode RX outputs the mutual capacitance change amount $\Delta C2$ to the fourth computing sub-unit 202. The fourth computing sub-unit 202 is configured to determine the thickness change amount $\Delta T$ of the first layer 3 according to the mutual capacitance change amount $\Delta C2$.

In some embodiments of the present disclosure, the fingerprint identification sensor further includes a second register, and a second mapping relationship $f_2$ between the mutual capacitance change amount $\Delta C2$ and the thickness change amount $\Delta T$ is stored in the second register in advance. The fourth computing sub-unit 202 includes a second mapping sub-unit configured to search, in the second mapping relationship $f_2$, for the thickness change amount $\Delta T$ according to the mutual capacitance change amount $\Delta C2$.

In some embodiments of the present disclosure, the second mapping relationship $f_2$ may be obtained by multiple measurements. In each measurement, the foldable display apparatus 1 is bent by a certain angle, the mutual capacitance change amount ΔC2 outputted by the touch sensing electrode RX at each position corresponding to the current angle is obtained, and the thickness change amount ΔT at each position of the first layer 3 corresponding to the current angle is measured. After multiple measurements, the second mapping relationship $f_2$ between the mutual capacitance change amount ΔC2 and the thickness change amount ΔT is obtained. In the manufacturing of the foldable display apparatus 1, the second mapping relationship $f_2$ is stored in the second register.

In some embodiments of the present disclosure, in the fingerprint detection calibration process, if the actually detected mutual capacitance change amount ΔC2 is not included in the second mapping relationship $f_2$, two mutual capacitance change amounts in the second mapping relationship $f_2$ close to the actually detected mutual capacitance change amount ΔC2 are obtained and used. Two thickness change amounts ΔT corresponding to the two mutual capacitance change amounts in the second mapping relationship $f_2$ are obtained, and the thickness change amount ΔT corresponding to the actually detected mutual capacitance change amount ΔC2 is determined by an interpolation operation on the two thickness change amounts ΔT.

The above are merely exemplary embodiments of the present disclosure, and are not intended to limit the present disclosure. For those skilled in the art, the present disclosure may be subject to various modifications and changes. Any modification, equivalent replacement, improvement and the like within the spirit and principle of the present disclosure all fall within the protection scope of the present disclosure.

What is claimed is:

1. A calibration method for fingerprint detection of a foldable display apparatus, wherein the foldable display apparatus comprises a display panel and a fingerprint identification sensor, the display panel comprises a plurality of imaging holes, and the fingerprint identification sensor comprises a plurality of sensing elements, the calibration method comprises: after the foldable display apparatus is switched from an unfolded state to a folded state, determining a target sensing element group corresponding to an imaging hole of the plurality of imaging holes when the foldable display apparatus is in the folded state, wherein the target sensing element group comprises a target number of sensing elements in the plurality of sensing elements, a center of the target sensing element group is located at a target position, and the target number is an integer greater than or equal to 1; and in the folded state, imaging a fingerprint pattern based on a signal fed back by the target sensing element group corresponding to the imaging hole; wherein determining the target sensing element group corresponding to the imaging hole of the plurality of imaging holes when the foldable display apparatus is in the folded state comprises: obtaining an initial sensing element group corresponding to the imaging hole when the foldable display apparatus is in the unfolded state, wherein the initial sensing element group comprises an initial number of sensing element, a center of the initial sensing element group is located at an initial position, and the initial number is an integer greater than or equal to 1; determining a displacement of the target position with respect to the initial position and a number difference between the initial number and the target number according to a bending angle of the display panel when the foldable display apparatus is in the folded state; and obtaining the target sensing element group according to the initial number, the initial position, the displacement, and the number difference, wherein the target sensing element group has the center at the target position and the target number; wherein determining the number difference between the initial number and the target number comprises: obtaining an object distance change amount and an image distance change amount of the imaging hole after the foldable display apparatus is switched from the unfolded state to the folded state; and determining the difference between the initial number and the target number according to the object distance change amount and the image distance change amount.

2. The calibration method according to claim 1, wherein determining the displacement of the target position with respect to an initial position comprises:
   obtaining a displacement of the imaging hole with respect to a preset reference point after the foldable display apparatus is switched from the unfolded state to the folded state; and
   determining the displacement of the target position with respect to the initial position according to the displacement of the imaging hole.

3. The calibration method according to claim 1, wherein the display panel further comprises a touch surface and a first layer, and the first layer is arranged between the touch surface and one of the plurality of sensing elements,
   obtaining the object distance change amount and the image distance change amount of the imaging hole comprises:
   obtaining a thickness change amount of the first layer after the foldable display apparatus is switched from the unfolded state to the folded state; and
   determining the object distance change amount and the image distance change amount of the imaging hole according to the thickness change amount.

4. The calibration method according to claim 3, wherein the foldable display apparatus further comprises a touch electrode, and a self-capacitance between the touch electrode and a reference voltage terminal is associated with a thickness of the first layer,
   obtaining the thickness change amount of the first layer comprises:
   obtaining a self-capacitance change amount outputted by the touch electrode after the foldable display apparatus is switched from the unfolded state to the folded state; and
   obtaining the thickness change amount of the first layer according to the self-capacitance change amount.

5. The calibration method according to claim 4, wherein the foldable display apparatus further comprises a first register storing a first mapping relationship between the self-capacitance change amount and the thickness change amount,
   obtaining the thickness change amount of the first layer according to the self-capacitance change amount comprises: searching the first mapping relationship and obtaining the thickness change amount of the first layer according to the self-capacitance change amount.

6. The calibration method according to claim 3, wherein the foldable display apparatus further comprises a touch sensing electrode and a touch driving electrode, and a mutual capacitance between the touch sensing electrode and a touch driving electrode is associated with a thickness of the first layer,
   obtaining the thickness change amount of the first layer comprises:

obtaining a mutual capacitance change amount outputted by the touch sensing electrode after the foldable display apparatus is switched from the unfolded state to the folded state; and obtaining the thickness change amount of the first layer according to the mutual capacitance change amount.

7. The calibration method according to claim 6, wherein the foldable display apparatus further comprises a second register storing a second mapping relationship between the mutual capacitance change amount and the thickness change amount, obtaining the thickness change amount of the first layer according to the mutual capacitance change amount comprises: searching the second mapping relationship and obtaining the thickness change amount of the first layer according to the mutual capacitance.

8. A foldable display apparatus, comprising: a display panel comprising a plurality of imaging holes; a fingerprint identification sensor comprising a plurality of sensing elements and configured to: after the foldable display apparatus is switched from an unfolded state to a folded state, determine a target sensing element group corresponding to an imaging hole of the plurality of imaging holes when the foldable display apparatus is in the current folded state, wherein the target sensing element group comprises a target number of sensing elements in the plurality of sensing elements, a center of the target sensing element group is located a target position, and the target number is an integer greater than or equal to 1; in the folded state, image a fingerprint pattern based on a signal fed back by the target sensing element group corresponding to the imaging hole; obtain an initial sensing element group corresponding to the imaging hole when the foldable display apparatus is in the unfolded state, wherein the initial sensing element group comprises an initial number of sensing element, a center of the initial sensing element group is located an initial position, and the initial number is an integer greater than or equal to 1, determine a displacement of the target position with respect to the initial position according to a bending angle of the display panel when the foldable display apparatus is in the folded state, determine a number difference between the initial number and the target number according to the bending angle of the display panel when the foldable display apparatus is in the folded state, determine the target sensing element group according to the initial number, the initial position, the displacement, and the number difference between the initial number and the target number, wherein the center of the target sensing element group is at the target position, and the number of the sensing element in the target sensing element group is the target number; obtain an object distance change amount of the imaging hole after the foldable display apparatus is switched from the unfolded state to the folded state, obtain an image distance change amount of the imaging hole after the foldable display apparatus is switched from the unfolded state to the folded state, and determine the number difference between the initial number and the target number according to the object distance change amount and the image distance change amount.

9. The foldable display apparatus according to claim 8, wherein the fingerprint identification sensor is configured to, determine a displacement of the imaging hole with respect to a preset reference point after the foldable display apparatus is switched from the unfolded state to the folded state, and determine the displacement of the target position with respect to the initial position according to the displacement of the imaging hole.

10. The foldable display apparatus according to claim 8, wherein the display panel further comprises a touch surface and a first layer, and the first layer is arranged between the touch surface and one of the plurality of sensing elements, the fingerprint identification sensor is configured to obtain a thickness change amount of the first layer after the foldable display apparatus is switched from the unfolded state to the folded state, and determine the object distance change amount and the image distance change amount of the imaging hole according to the thickness change amount.

11. The foldable display apparatus according to claim 10, further comprising: a touch electrode, wherein a self-capacitance between the touch electrode and a reference voltage terminal is associated with a thickness of the first layer, the fingerprint identification sensor is configured to obtain a self-capacitance change amount outputted by the touch electrode after the foldable display apparatus is switched from the unfolded state to the folded state; and obtain the thickness change amount of the first layer according to the self-capacitance change amount.

12. The foldable display apparatus according to claim 11, further comprising: a first register pre-storing a first mapping relationship between the self-capacitance change amount and the thickness change amount, wherein the fingerprint identification sensor is configured to search the first mapping relationship according to the self-capacitance change amount and obtain the thickness change amount of the first layer.

13. The foldable display apparatus according to claim 10, further comprising: a touch sensing electrode and a touch driving electrode, wherein a mutual capacitance between the touch sensing electrode and a touch driving electrode is associated with a thickness of the first layer, the touch sensing electrode outputs a mutual capacitance change amount after the foldable display apparatus is switched from the unfolded state to the folded state, and the fingerprint identification sensor is configured to obtain the thickness change amount of the first layer according to the mutual capacitance change amount.

14. The foldable display apparatus according to claim 13, further comprising: a second register pre-storing a second mapping relationship between the mutual capacitance change amount and the thickness change amount, wherein the fingerprint identification sensor is configured to search the second mapping relationship according to the mutual capacitance change amount and obtain the thickness change amount of the first layer.

* * * * *